(12) United States Patent
Li et al.

(10) Patent No.: US 11,012,978 B2
(45) Date of Patent: May 18, 2021

(54) UPLINK SCHEDULING-FREE TRANSMISSION METHOD AND DEVICE WITH GROUPS OF PDMA RESOURCE POOLS

(71) Applicant: CHINA ACADEMY OF TELECOMMUNICATIONS TECHNOLOGY, Beijing (CN)

(72) Inventors: Tie Li, Beijing (CN); Shanzhi Chen, Beijing (CN); Shaoli Kang, Beijing (CN); Bin Ren, Beijing (CN); Yanping Xing, Beijing (CN); Zheng Zhao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/349,164

(22) PCT Filed: Aug. 22, 2017

(86) PCT No.: PCT/CN2017/098392
§ 371 (c)(1),
(2) Date: May 10, 2019

(87) PCT Pub. No.: WO2018/099144
PCT Pub. Date: Jun. 7, 2018

(65) Prior Publication Data
US 2019/0289574 A1    Sep. 19, 2019

(30) Foreign Application Priority Data
Nov. 30, 2016  (CN) .......................... 201611081168.5

(51) Int. Cl.
*H04W 72/02* (2009.01)
*H04W 72/04* (2009.01)
(Continued)

(52) U.S. Cl.
CPC .......... *H04W 72/02* (2013.01); *H04L 5/0035* (2013.01); *H04L 47/821* (2013.01);
(Continued)

(58) Field of Classification Search
CPC ..... H04L 12/5695; H04L 47/74; H04L 47/78; H04L 5/0035; H04L 47/821; H04W 16/00;
(Continued)

(56) References Cited

U.S. PATENT DOCUMENTS

2014/0050181 A1   2/2014 Tiirola et al.
2014/0094183 A1   4/2014 Gao et al.
(Continued)

FOREIGN PATENT DOCUMENTS

CN   102340874 A       2/2012
CN   102548006 A  *    7/2012
(Continued)

OTHER PUBLICATIONS

English Translation of CN 102548006 A (Year: 2019).*
(Continued)

*Primary Examiner* — Salvador E Rivas
(74) *Attorney, Agent, or Firm* — Harness, Dickey & Pierce, P.L.C.

(57) ABSTRACT

An uplink scheduling-free transmission method and an uplink scheduling-free transmission device are provided. The uplink scheduling-free transmission method includes: dividing, by a base station, MA resources into groups of MA resources, and configuring, by the base station, the groups of MA resources to obtain at least two groups of MA resource pools, wherein at least parts of respective MA resources in the at least two groups of MA resource pools are different from each other; and notifying, by the base station, a UE of the at least two groups of MA resource pools, to enable the (Continued)

---

101 — dividing, by a base station, MA resources into groups of MA resources, and configuring, by the base station, the groups of MA resources to obtain at least two groups of MA resource pools, wherein at least parts of respective MA resources in the at least two groups of MA resource pools are different from each other 102 — notifying, by the base station, a UE of the at least two groups of MA resource pools, to enable the UE to select an MA resource pool from the at least two groups of MA resource pools, wherein the selected MA resource pool is to be used by the UE UE to select an MA resource pool from the at least two groups of MA resource pools, wherein the selected MA resource pool is to be used by the UE.

14 Claims, 3 Drawing Sheets

(51) Int. Cl.
*H04W 74/08* (2009.01)
*H04W 74/00* (2009.01)
*H04L 12/911* (2013.01)
*H04L 5/00* (2006.01)

(52) U.S. Cl.
CPC ..... *H04W 72/0413* (2013.01); *H04W 74/006* (2013.01); *H04W 74/0833* (2013.01); *H04W 72/04* (2013.01); *H04W 74/008* (2013.01)

(58) Field of Classification Search
CPC ..... H04W 16/02; H04W 16/10; H04W 72/04; H04B 17/382
See application file for complete search history.

(56) References Cited

U.S. PATENT DOCUMENTS

| 2019/0215816 A1 | 7/2019 | Tang |
| 2019/0268924 A1* | 8/2019 | Kim ..................... H04W 72/12 |

FOREIGN PATENT DOCUMENTS

| CN | 103843444 A | 6/2014 |
| CN | 105101250 A | 11/2015 |
| EP | 3468289 A1 | 4/2019 |

OTHER PUBLICATIONS

Chih-Lin et al., "New Paradigm of 5G Wireless Internet", IEEE Journal on Selected Areas in Communications, vol. 34, Issue: 3, Mar. 2016, pp. 474-482 (Year: 2016).*

S. Chen, B. Ren, Q. Gao, S. Kang, S. Sun and K. Niu, "Pattern Division Multiple Access—A Novel Nonorthogonal Multiple Access for Fifth-Generation Radio Networks," in IEEE Transactions on Vehicular Technology, vol. 66, No. 4, pp. 3185-3196, Apr. 2017, doi: 10.1109/TVT.2016.2596438. (Year: 2017).*

B. Wang, K. Wang, Z. Lu, T. Xie and J. Quan, "Comparison study of non-orthogonal multiple access schemes for 5G," 2015 IEEE International Symposium on Broadband Multimedia Systems and Broadcasting, Ghent, 2015, pp. 1-5, doi: 10.1109/BMSB.2015.7177186. (Year: 2015).*

L. Dai, B. Wang, Y. Yuan, S. Han, I. Chih-lin and Z. Wang, "Non-orthogonal multiple access for 5G: solutions, challenges, opportunities, and future research trends," in IEEE Communications Magazine, vol. 53, No. 9, pp. 74-81, Sep. 2015, doi: 10.1109/MCOM.2015.7263349. (Year: 2015).*

Chinese Office Action dated Sep. 19, 2018 for CN Application No. 201611081168.5.

PCT Written Opinion of the International Searching Authority dated Nov. 17, 2017 for International Patent Application No. PCT/CN2017/098392.

Extended European Search Report dated Oct. 10, 2019 for EP Application No. 17876775.2.

"Considerations on pre-configured resource for grant-free based UL non-orthogonal MA", 3GPP TSG RAN WG1 meeting #86bis, R11608919, Spreadtrum Communications, Oct. 14, 2016, Lisbon, Portugal.

"Grant-free UL transmissions in NR", 3GPP TSG RAN WG1 meeting #86bis, R1-1609499, Intel Corporation, Oct. 10-14, 2016, Lisbon, Portugal.

"System-level analysis of UL NOMA schemes", 3GPP TSG RAN WG1 meeting #86bis, R1-1609498, Intel Corporation, Oct. 10-14, 2016, Lisbon, Portugal.

"On mMTC multiple access", 3GPP TSG RAN WG1 meeting #87, R1-1612943, Ericsson, Nov. 14-18, 2016, Reno, Nevada.

"Uplink Multi-user Transmission for Massive MTD", 3GPP TSG RAN WG1 meeting #70, R1-152208, ZTE, Dec. 7-10, 2015, Sitges, Spain.

* cited by examiner 101 dividing, by a base station, MA resources into groups of MA resources, and configuring, by the base station, the groups of MA resource pools, to obtain at least two groups of MA resource pools, wherein at least parts of respective MA resources in the at least two groups of MA resource pools are different from each other 102 notifying, by the base station, a UE of the at least two groups of MA resource pools, to enable the UE to select an MA resource pool from the at least two groups of MA resource pools, wherein the selected MA resource pool is to be used by the UE

Fig.1

201 acquiring, by a UE, at least two groups of MA resource pools preconfigured by a base station, wherein at least parts of respective MA resources in the at least two groups of MA resource pools are different from each other 202 selecting, by the UE, an MA resource pool from the at least two groups of MA resource pools, wherein the selected MA resource pool is to be used by the UE

Fig.2

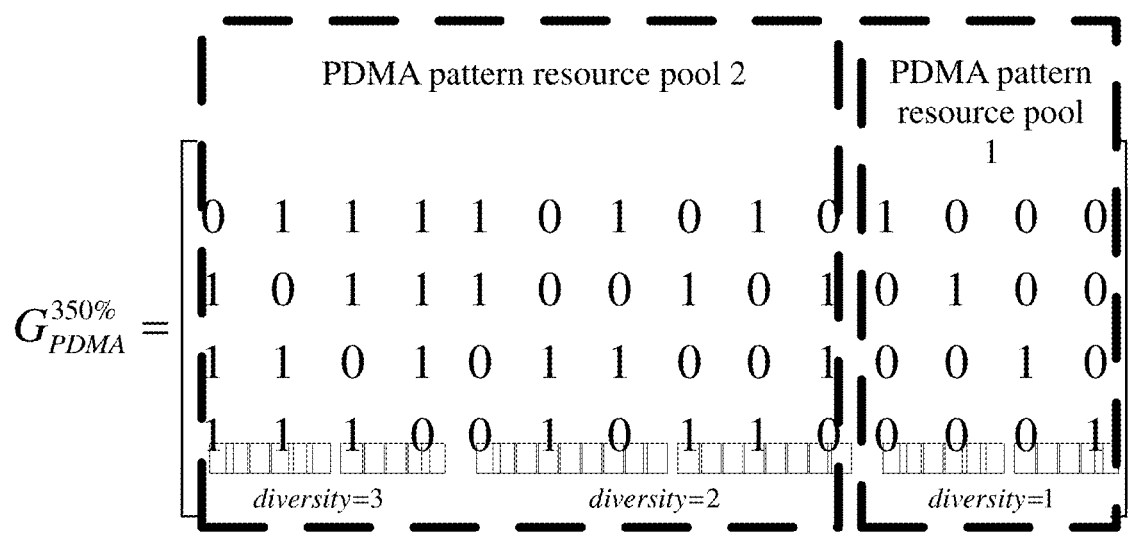

Fig.3

UPLINK SCHEDULING-FREE TRANSMISSION METHOD AND DEVICE WITH GROUPS OF PDMA RESOURCE POOLS

CROSS-REFERENCE TO RELATED APPLICATIONS

The present application is the U.S. national phase of PCT Application No. PCT/CN2017/098392 filed on Aug. 22, 2017, which claims priority to Chinese patent application No. 201611081168.5 filed on Nov. 30, 2016, the entire contents of each of which is incorporated herein by reference in their entireties.

TECHNICAL FIELD

The present disclosure relates to the field of communication technology, in particular to an uplink scheduling-free transmission method and an uplink scheduling-free transmission device.

BACKGROUND

Three types of New Radio (NR) scenarios have been proposed by the $3^{rd}$-Generation Partnership Projection (3GPP), i.e., massive Machine Type Communications (mMTC), Ultra-Reliable and Low Latency Communications (URLLC) and enhanced Mobile Broadband (eMBB). In the mMTC scenario, there is a big connection, and a non-orthogonal uplink scheduling-free transmission scheme, as an effective transmission mechanism, may meet the requirement in this scenario. Through the scheduling-free scheme, it is able to reduce a large quantity of signaling load, and through the non-orthogonal scheme, it is able for a large quantity of users in the system to access simultaneously. When a large quantity of users access in the network simultaneously, the inter-cell interference is a bottleneck for the network performance. For a scenario with scheduling, it is able to reduce the inter-cell interference through interference coordination, and for the scheduling-free scenario, it is impossible to reduce the inter-cell interference through the interference coordination.

In the mMTC scenario, it is able for the non-orthogonal uplink scheduling-free transmission scheme to meet the requirement on big connection and broad coverage. Due to the use of the uplink scheduling-free transmission scheme, the data transmission may be performed by a large quantity of User Equipments (UEs) simultaneously, and these UEs may randomly select Multiple Access (MA) resources, so the inter-cell interference at a base station side may increase dramatically. Even when an advanced receiver is adopted, it is still impossible to eliminate the inter-cell interference.

SUMMARY

In view of the above, an object of the present disclosure is to provide an uplink scheduling-free transmission method and an uplink scheduling-free transmission device, so as to reduce the inter-cell interference.

In a first aspect, the present disclosure provides in some embodiments an uplink scheduling-free transmission method, including: dividing, by a base station, MA resources into groups of MA resources, and configuring, by the base station, the groups of MA resources to obtain at least two groups of MA resource pools, wherein at least one of the MA resources in any one of the at least two groups of MA resource pools is different from each of the MA resources in any other one of the at least two groups of MA resource pools; and notifying, by the base station, a UE of the at least two groups of MA resource pools, to enable the UE to select an MA resource pool from the at least two groups of MA resource pools, wherein the selected MA resource pool is to be used by the UE.

In a possible embodiment of the present disclosure, dividing by the base station the MA resources into groups of MA resources, and configuring by the base station the groups of MA resources to obtain the at least two groups of MA resource pools includes: dividing, by the base station, the MA resources into the groups of MA resources, and configuring, by the base station, the groups of MA resources to obtain a first MA resource pool and a second MA resource pool, wherein the first MA resource pool includes all or a part of orthogonal MA resources, and the second MA resource pool includes all MA resources in a system or remaining MA resources in the system other than the MA resources in the first MA resource pool; and notifying by the base station the UE of the at least two groups of MA resource pools, to enable the UE to select the MA resource pool from the at least two groups of MA resource pools includes: notifying, by the base station, the UE of the first MA resource pool and the second MA resource pool, to enable the UE to select the MA resource pool from the first MA resource pool and the second MA resource pool.

In a possible embodiment of the present disclosure, the MA resources include any one or more of a time-domain resource, a frequency-domain resource, a space-domain resource and a code-domain resource. The code-domain resource includes, but not limited to, any one or more of a codebook, a codeword, a sequence, an interleaver and a mapping pattern.

In a possible embodiment of the present disclosure, the first MA resource pool is differentiated from the second MA resource pool through an MA resource pool threshold value.

In a second aspect, the present disclosure provides in some embodiments an uplink scheduling-free transmission method, including: acquiring, by a UE, at least two groups of MA resource pools preconfigured by a base station, wherein at least one of the MA resources in any one of the at least two groups of MA resource pools is different from each of the MA resources in any other one of the at least two groups of MA resource pools; and selecting, by the UE, an MA resource pool from the at least two groups of MA resource pools, wherein the selected MA resource pool is to be used by the UE.

In a possible embodiment of the present disclosure, the at least two groups of MA resource pools include a first MA resource pool and a second MA resource pool, the first MA resource pool includes all or a part of orthogonal MA resources, and the second MA resource pool includes all MA resources in a system or remaining MA resources in the system other than the MA resources in the first MA resource pool.

In a possible embodiment of the present disclosure, the first MA resource pool is differentiated from the second MA resource pool through an MA resource pool threshold value.

In a possible embodiment of the present disclosure, selecting by the UE the MA resource pool from the at least two groups of MA resource pools includes: acquiring, by the UE, a measurement value; and selecting, by the UE, the MA resource pool from the at least two groups of MA resource pools in accordance with the measurement value and the MA resource pool threshold value.

In a third aspect, the present disclosure provides in some embodiments a base station, including: a configuration module configured to divide MA resources into groups of MA resources, and configure the groups of MA resources to obtain at least two groups of MA resource pools, wherein at least one of the MA resources in any one of the at least two groups of MA resource pools is different from each of the MA resources in any other one of the at least two groups of MA resource pools; and a notification module configured to notify a UE of the at least two groups of MA resource pools, to enable the UE to select an MA resource pool from the at least two groups of MA resource pools, wherein the selected MA resource pool is to be used by the UE In a possible embodiment of the present disclosure, the configuration module is further configured to divide the MA resources into the groups of MA resources, and configure the groups of MA resources to obtain a first MA resource pool and a second MA resource pool, wherein the first MA resource pool includes all or a part of orthogonal MA resources, and the second MA resource pool includes all MA resources in a system or remaining MA resources in the system other than the MA resources in the first MA resource pool; and the notification module is further configured to notify the UE of the first MA resource pool and the second MA resource pool, to enable the UE to select the MA resource pool from the first MA resource pool and the second MA resource pool.

In a possible embodiment of the present disclosure, the MA resources include any one or more of a time-domain resource, a frequency-domain resource, a space-domain resource and a code-domain resource. The code-domain resource includes, but not limited to, any one or more of a codebook, a codeword, a sequence, an interleaver and a mapping pattern In a possible embodiment of the present disclosure, the first MA resource pool is differentiated from the second MA resource pool through an MA resource pool threshold value.

In a fourth aspect, the present disclosure provides in some embodiments a UE, including: a reception module configured to acquire at least two groups of MA resource pools preconfigured by a base station, wherein at least one of the MA resources in any one of the at least two groups of MA resource pools is different from each of the MA resources in any other one of the at least two groups of MA resource pools; and a selection module configured to select an MA resource pool from the at least two groups of MA resource pools, wherein the selected MA resource pool is to be used by the UE.

In a possible embodiment of the present disclosure, the at least two groups of MA resource pools include a first MA resource pool and a second MA resource pool, the first MA resource pool includes all or a part of orthogonal MA resources, and the second MA resource pool includes all MA resources in a system or remaining MA resources in the system other than the MA resources in the first MA resource pool.

In a possible embodiment of the present disclosure, the first MA resource pool is differentiated from the second MA resource pool through an MA resource pool threshold value.

In a possible embodiment of the present disclosure, the selection module includes: a measurement unit configured to acquire a measurement value; and a selection unit configured to select the MA resource pool from the at least two groups of MA resource pools in accordance with the measurement value and the MA resource pool threshold value.

In a fifth aspect, the present disclosure provides in some embodiments a base station, including a processor, a memory and a transceiver. The processor is configured to read a program stored in the memory, so as to: divide MA resources into groups of MA resources, and configure the groups of MA resources to obtain at least two groups of MA resource pools, wherein at least one of the MA resources in any one of the at least two groups of MA resource pools is different from each of the MA resources in any other one of the at least two groups of MA resource pools; and notify through the transceiver a UE of the at least two groups of MA resource pools, to enable the UE to select an MA resource pool from the at least two groups of MA resource pools, wherein the selected MA resource pool is to be used by the UE. The transceiver is configured to receive and transmit data. The memory is configured to store therein data for the operation of the processor.

In a sixth aspect, the present disclosure provides in some embodiments a UE, including a processor, a memory and a transceiver. The processor is configured to read a program stored in the memory, so as to: acquire through the transceiver at least two groups of MA resource pools preconfigured by a base station, wherein at least one of the MA resources in any one of the at least two groups of MA resource pools is different from each of the MA resources in any other one of the at least two groups of MA resource pools; and select an MA resource pool from the at least two groups of MA resource pools, wherein the selected MA resource pool is to be used by the UE. The transceiver is configured to receive and transmit data. The memory is configured to store therein data for the operation of the processor.

According to some embodiments of the present disclosure, the base station may divide MA resources into groups of MA resources, and configure the groups of MA resources to obtain at least two groups of MA resource pools, wherein at least one of the MA resources in any one of the at least two groups of MA resource pools is different from each of the MA resources in any other one of the at least two groups of MA resource pools; and the UE may select and use an MA resource pool from the at least two groups of MA resource pools. As a result, through the division of the MA resources into groups and the reusing of the MA resources, it is able to reduce the inter-cell interference, and prevent the generation of a large quantity of signaling loads without decreasing the quantity of the available MA resources.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain other drawings without any creative effort.

FIG. 1 is a flow chart of an uplink non-orthogonal scheduling-free method according to some embodiments of the present disclosure;

FIG. 2 is a flow chart of another uplink non-orthogonal scheduling-free method according to some embodiments of the present disclosure;

FIG. 3 is a schematic view showing a 350% Pattern Division Multiple Access (PDMA) pattern matrix according to some embodiments of the present disclosure;

DETAILED DESCRIPTION OF THE EMBODIMENTS

Figure 4:
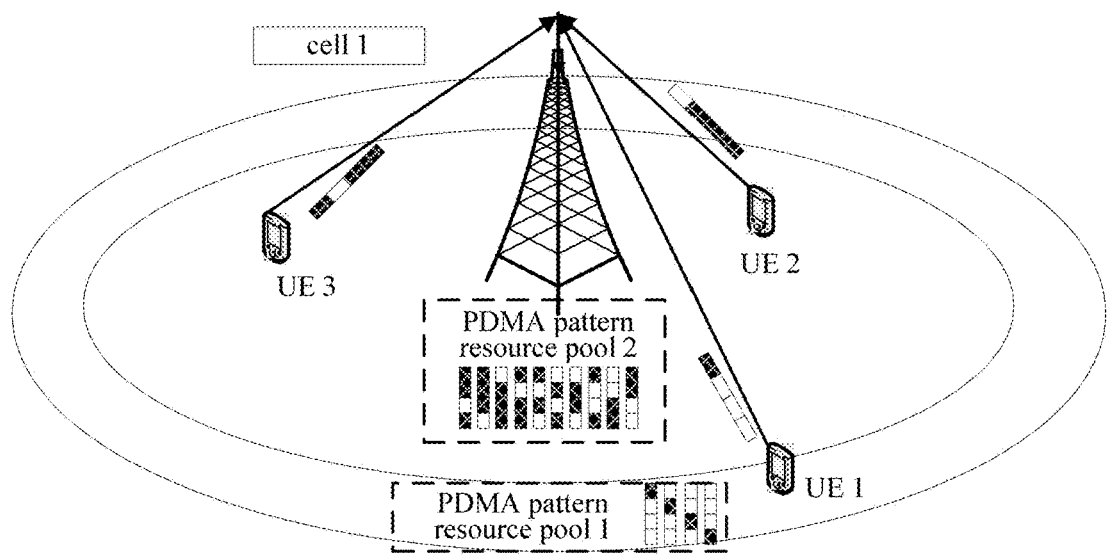
FIG. 4 is a schematic view showing intra-cell interference for UE1 in cell 1 when the 350% PDMA pattern matrix in FIG. 3 is adopted according to some embodiments of the present disclosure.

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure, and convey the present disclosure to a person skilled in the art in a complete manner.

It should be appreciated that, the present disclosure may be implemented as a system, an apparatus, a device, a method or a computer program product. Hence, the present disclosure may be implemented in the form of full hardware, full software (including firmware, resident software, microcode, or the like), or a combination the hardware and the software.

Usually, for an uplink non-orthogonal scheduling-free mechanism, the inter-cell interference is controlled through a frequency reuse scheme including Fractional Frequency Reuse (FR) or Soft Frequency Reuse (SFR). For a system with scheduling scheme, the inter-cell interference may be reduced through Inter-Cell Interference Coordinate (ICIC). However, there exist such defects as a small quantity of reusable resources for the above frequency reuse scheme, and a large quantity of signaling loads may be generated in a big connection scenario when the ICIC is adopted. Hence, an object of the present disclosure is to divide MA resources into groups and the reusing of the MA resources in accordance with characteristics of the MA resources, so as to reduce the inter-cell interference.

The present disclosure provides in some embodiments an uplink non-orthogonal scheduling-free method which, as shown in FIG. 1, includes the following steps.

Step 101: dividing, by a base station, MA resources into groups of MA resources, and configuring, by the base station, the groups of MA resources to obtain at least two groups of MA resource pools, wherein at least parts of respective MA resources in the at least two groups of MA resource pools are different from each other.

For example, the plurality of MA resources may be divided and configured to obtain two groups of MA resource pools, i.e., a first MA resource pool and a second MA resource pool, and a part of the MA resources in the second MA resource pool may be different from the MA resources in the first MA resource pool.

For another example, the plurality of MA resources may be divided and figured to obtain three groups of MA resource pools, i.e., a first MA resource pool, a second MA resource pool and a third MA resource pool. A part of the MA resources in the second MA resource pool may be different from MA resources in the first MA resource pool and MA resources in the third MA resource pool, and a part of the MA resources in the first MA resource pool may be different from the MA resources in the third MA resource pool.

In a possible embodiment of the present disclosure, the MA resources may include any one or more of a time-domain resource, a frequency-domain resource, a space-domain resource and a code-domain resource, and the code-domain resource may include, but not limited to, any one or more of a codebook, a codeword, a sequence, an interleaver and a mapping pattern.

In a possible embodiment of the present disclosure, the base station may divide the plurality of MA resources into groups of MA resources, and configure the groups of MA resources to obtain a first MA resource pool and a second MA resource pool. The first MA resource pool may include all or a part of orthogonal MA resources, and the first MA resource pool may include all or a part of orthogonal MA resources, and the second MA resource pool may include all MA resources in a system or remaining MA resources in the system other than the MA resources in the first MA resource pool, i.e., the second MA resource pool may include the MA resources that are not included in the first MA resource pool, or include all the MA resources including those in the first MA resource pool.

In a possible embodiment of the present disclosure, the first MA resource pool may be differentiated from the second MA resource pool through an MA resource pool threshold value.

Step 102: notifying, by the base station, a UE of the at least two groups of MA resource pools, to enable the UE to select an MA resource pool from the at least two groups of MA resource pools, wherein the selected MA resource pool is to be used by the UE.

Correspondingly, the base station may notify the UE of the first MA resource pool and the second MA resource pool, so that the UE may select and use one of the first MA resource pool and the second MA resource pool.

According to some embodiments of the present disclosure, the base station may divide MA resources into groups of MA resources, and configure the groups of MA resources to obtain at least two groups of MA resource pools, wherein at least parts of respective MA resources in the at least two groups of MA resource pools are different from each other; and the UE may select and use an MA resource pool from the at least two groups of MA resource pools. As a result, through the division of the MA resources into groups and the reusing of the MA resources, it is able to reduce the inter-cell interference, and prevent the generation of a large quantity of signaling loads without decreasing the quantity of the available MA resources.

The present disclosure further provides in some embodiments an uplink non-orthogonal scheduling-free method which, as shown in FIG. 2, includes the following steps.

Step 201: acquiring, by a UE, at least two groups of MA resource pools preconfigured by a base station, wherein at least parts of respective MA resources in the at least two groups of MA resource pools are different from each other.

In a possible embodiment of the present disclosure, the MA resources may include any one or more of a time-domain resource, a frequency-domain resource, a space-domain resource and a code-domain resource, and the code-domain resource may include, but not limited to, any one or more of a codebook, a codeword, a sequence, an interleaver and a mapping pattern.

In a possible embodiment of the present disclosure, the at least two groups of MA resource pools may include a first MA resource pool and a second MA resource pool. The first MA resource pool includes all or a part of orthogonal MA resources, and the second MA resource pool includes all MA resources in a system or remaining MA resources in the system other than the MA resources in the first MA resource pool, i.e., the second MA resource pool may include the MA resources that are not included in the first MA resource pool, or include all the MA resources including those in the first MA resource pool.

In a possible embodiment of the present disclosure, the first MA resource pool may be differentiated from the second MA resource pool through an MA resource pool threshold value.

Step 202: selecting, by the UE, an MA resource pool from the at least two groups of MA resource pools, wherein the selected MA resource pool is to be used by the UE.

In a possible embodiment of the present disclosure, in Step 202, the UE may acquire a measurement value, and the measurement value may be a signal strength measurement value, a signal received quality measurement value, a signal-to-noise ratio measurement value, or the like, which will not be particularly defined herein. Then, the UE may select and use the MA resource pool from the at least two groups of MA resource pools in accordance with the measurement value and the MA resource pool threshold value.

According to some embodiments of the present disclosure, the base station may divide MA resources into groups of MA resources, and configure the groups of MA resources to obtain at least two groups of MA resource pools, wherein at least parts of respective MA resources in the at least two groups of MA resource pools are different from each other; and the UE may select and use an MA resource pool from the at least two groups of MA resource pools. As a result, through the division of the MA resources into groups and the reusing of the MA resources, it is able to reduce the inter-cell interference, and prevent the generation of a large quantity of signaling loads without decreasing the quantity of the available MA resources.

It should be appreciated that, the methods have been described hereinabove by taking the uplink non-orthogonal scheduling-free transmission as an example, and based on the embodiments of the present disclosure, it is obvious for a person skilled in the art that the methods may also be applied to the uplink orthogonal scheduling-free transmission in a similar manner.

The present disclosure will be described hereinafter in more details by taking the PDMA uplink scheduling-free transmission an example.

For a PDMA technology, joint optimization is performed at both a transmitter and a receiver. To be specific, at the transmitter, information for a plurality of users is divided at different diversity levels and then mapped to a same time-domain resource, frequency-domain resource or space-domain resource, and different users having overlapped same resources are differentiated from each other through different encoding patterns. At the receiver, a multi-user detection technique with high performance and low complexity, e.g., a Belief Propagation Algorithm (BPA), is adopted, so as to approach to a maximum posterior probability for the detection performance. A characteristic of the MA resources adopted in the PDMA technology lies in that different pattern resources share a same time-domain resource, frequency-domain resource, space-domain resource, or the like. The pattern resources in different PDMA resource pools have different diversity levels.

Taking a PDMA 350% overload encoding pattern matrix as an example, the diversity levels for the pattern resources in the MA resource pools may be 3, 2 and 1 respectively, as shown in FIG. 3. All the pattern resources having the diversity level of 1 may form a maximum orthogonal group of MA resource pools.

Figure 5:
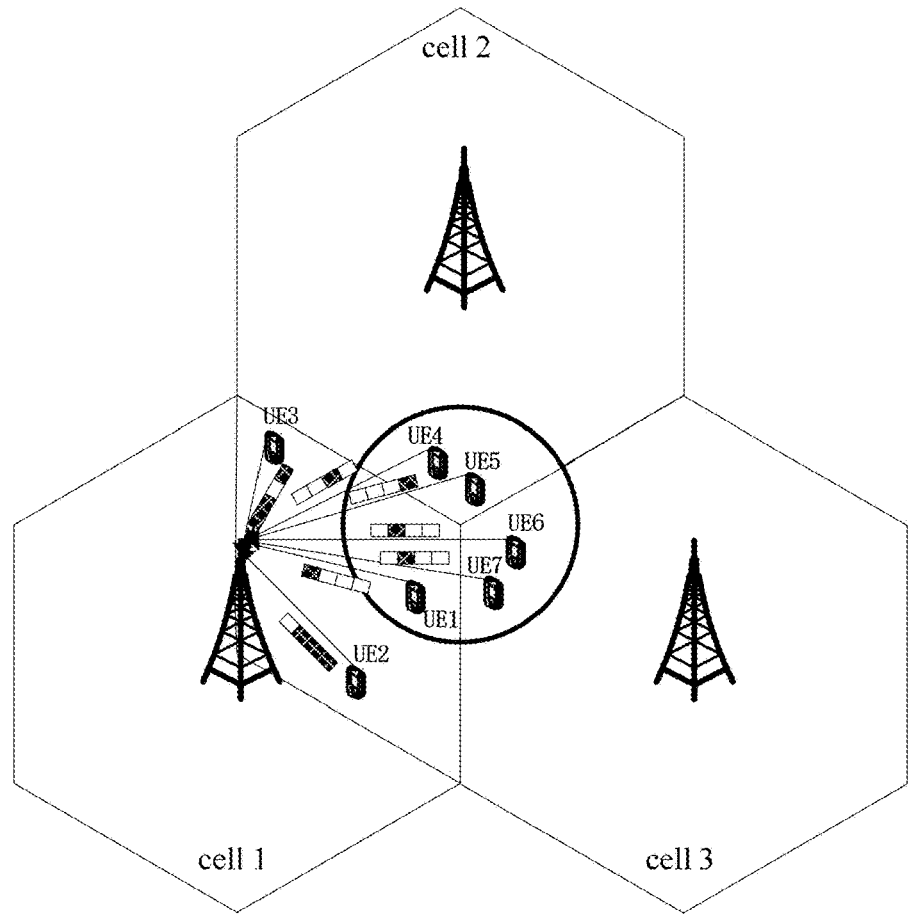
FIG. 5 is a schematic view showing the intra-cell interference and inter-cell interference for UE1 in cell 1 when the 350% PDMA pattern matrix in FIG. 3 is adopted according to some embodiments of the present disclosure.

FIG. 5 shows three sectors, in which three UEs (UE1, UE2 and UE3) reside in cell-1, two UEs (UE4 and UE5) reside in cell-2, and two UEs (UE6 and UE7) reside in cell-3. The PDMA 350% total encoding pattern resource pool in FIG. 3 may be provided in each sector.

Step 1: the PDMA 350% total encoding pattern resource pools may be configured into two groups in each sector of the network, as shown in FIG. 4, and a threshold $Z_{gate}=\beta$ is between the two groups. All PDMA patterns in a PDMA pattern resource pool 1 may be orthogonal to each other.

Step 2: when data is to be transmitted by the UE, a measurement value, e.g., SINR=$\alpha$, may be acquired at first. When $\alpha \le \beta$, the UE may randomly select one PDMA pattern from the PDMA pattern resource pool 1, and when $\alpha > \beta$, the UE may randomly select one PDMA pattern from a PDMA pattern resource pool 2.

Step 3: based on the above step 2, the UE in a certain sector may select the PDMA pattern as shown in FIG. 5.

Based on the above steps, a sparse orthogonal sequence is adopted by a cell-edge UE, so it is able to reduce the inter-cell interference for the UEs in the cell.

Figure 6:
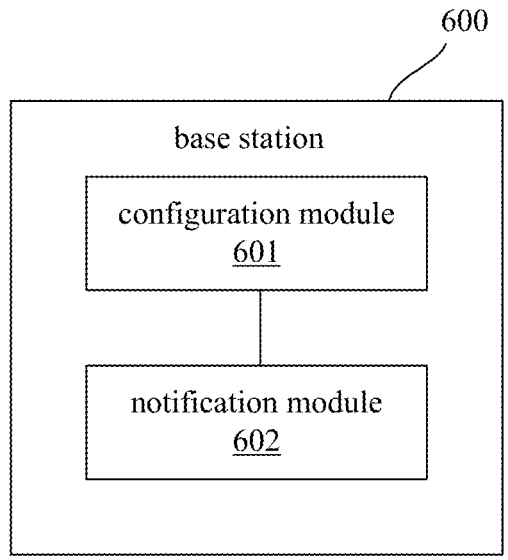
FIG. 6 is a schematic view showing a base station according to some embodiments of the present disclosure.

The present disclosure further provides in some embodiments a base station 600 which, as shown in FIG. 6, includes: a configuration module 601 configured to divide MA resources into groups of MA resources, and configure the groups of MA resources to obtain at least two groups of MA resource pools, wherein at least parts of respective MA resources in the at least two groups of MA resource pools are different from each other; and a notification module 602 configured to notify a UE of the at least two groups of MA resource pools, to enable the UE to select an MA resource pool from the at least two groups of MA resource pools, wherein the selected MA resource pool is to be used by the UE.

In a possible embodiment of the present disclosure, the configuration module is further configured to divide the MA resources into the groups of MA resources, and configure the groups of MA resources to obtain a first MA resource pool and a second MA resource pool, wherein the first MA resource pool includes all or a part of orthogonal MA resources, and the second MA resource pool includes all MA resources in a system or remaining MA resources in the system other than the MA resources in the first MA resource pool, i.e., the second MA resource pool may include the MA resources that are not included in the first MA resource pool, or include all the MA resources including those in the first MA resource pool.

Correspondingly, the notification module is further configured to notify the UE of the first MA resource pool and the second MA resource pool, to enable the UE to select the MA resource pool from the first MA resource pool and the second MA resource pool.

In a possible embodiment of the present disclosure, the MA resources may include any one or more of a time-domain resource, a frequency-domain resource, a space-domain resource and a code-domain resource, and the code-domain resource may include, but not limited to, any one or more of a codebook, a codeword, a sequence, an interleaver and a mapping pattern.

In a possible embodiment of the present disclosure, the first MA resource pool may be differentiated from the second MA resource pool through an MA resource pool threshold value.

Figure 7:
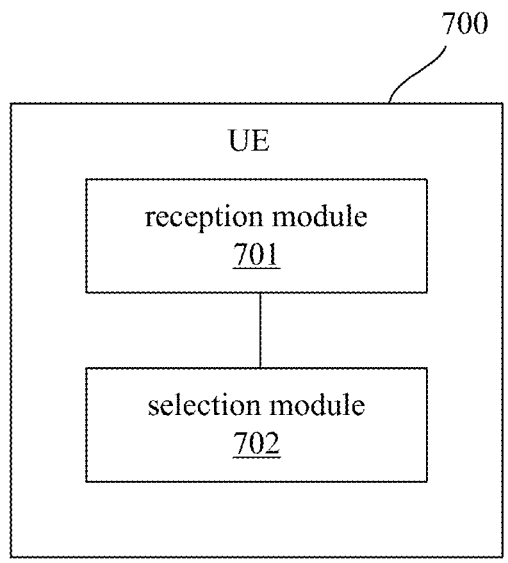
FIG. 7 is a schematic view showing a UE according to some embodiments of the present disclosure.

The present disclosure further provides in some embodiments a UE 700 which, as shown in FIG. 7, includes: a reception module 701 configured to acquire at least two groups of MA resource pools preconfigured by a base station, wherein at least parts of respective MA resources in the at least two groups of MA resource pools are different from each other; and a selection module 702 configured to select an MA resource pool from the at least two groups of MA resource pools, wherein the selected MA resource pool is to be used by the UE.

In a possible embodiment of the present disclosure, the at least two groups of MA resource pools may include a first MA resource pool and a second MA resource pool. The first MA resource pool includes all or a part of orthogonal MA resources, and the second MA resource pool includes all MA resources in a system or remaining MA resources in the system other than the MA resources in the first MA resource pool, i.e., the second MA resource pool may include the MA resources that are not included in the first MA resource pool, or include all the MA resources including those in the first MA resource pool.

In a possible embodiment of the present disclosure, the first MA resource pool may be differentiated from the second MA resource pool through an MA resource pool threshold value.

In a possible embodiment of the present disclosure, the selection module may include: a measurement unit configured to acquire a measurement value, e.g., signal strength measurement value, signal received quality measurement value or a signal-to-noise ratio measurement value, which is not particularly defined herein; and a selection unit configured to select the MA resource pool from the at least two groups of MA resource pools in accordance with the measurement value and the MA resource pool threshold value.

It should be further appreciated that, such phrases as "one embodiment" and "one of the embodiments" intend to indicate that the features, structures or characteristics are contained in at least some embodiments of the present disclosure, rather than necessarily referring to a same embodiment. In addition, the features, structures or characteristics may be combined in any embodiment or embodiments in any appropriate manner.

It should be further appreciated that, in the embodiments of the present disclosure, serial numbers of the steps shall not be used to define the order of the steps, and instead, the order of the steps shall be determined in accordance with their functions and internal logics. The present disclosure is not limited by serial numbers of the steps.

In addition, the terms "system" and "network" may be replaced with each other. The expression "and/or" is merely used to describe the relationship between objects, and it includes three relationships. For example, "A and/or B" may represent that, there is only A, there are both A and B, and there is only B. Further, the symbol "/" between two objects usually refers to "or" a relationship between the two objects.

It should be further appreciated that, the expression "B corresponding to A" means that B is associated with A and may be determined in accordance with A. However, when B is determined in accordance with A, it means that B may be determined in accordance with A and/or other information.

It should be further appreciated that, the device and method may be implemented in any other ways. For example, the embodiments for the apparatus are merely for illustrative purposes, and the units are provided merely on the basis of their logic functions. During the actual application, the units may be provided in another manner, e.g., the units may be combined together or integrated into another system. Alternatively, some characteristics may be omitted or not executed. In addition, the coupling connection, direct coupling connection or communication connection may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute some steps of the methods according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are preferred embodiments of the present disclosure. A person skilled in the art may make further modifications and improvements without departing from the principles of the present disclosure, and these modifications and improvements shall also fall within the scope of the present disclosure.

What is claimed is:

1. An uplink scheduling-free transmission method, comprising:
dividing, by a base station, Pattern Division Multiple Access (PDMA) resources into groups of PDMA resources according to a diversity level, and configuring, by the base station, the groups of PDMA resources to obtain at least two groups of PDMA resource pools, wherein at least parts of respective PDMA resources in the at least two groups of PDMA resource pools are different from each other, and the at least two groups of PDMA resource pools are differentiated from each other through a PDMA resource pool threshold value; and
notifying, by the base station, a User Equipment (UE) of the at least two groups of PDMA resource pools, to enable the UE to select, according to a measurement value acquired by the UE and the PDMA resource pool threshold value, a PDMA resource pool from the at least two groups of PDMA resource pools, wherein the selected PDMA resource pool is to be used by the UE.

2. The uplink scheduling-free transmission method according to claim 1, wherein
dividing by the base station the PDMA resources into groups of PDMA resources according to the diversity level, and configuring by the base station the groups of PDMA resources to obtain the at least two groups of PDMA resource pools comprises:
dividing, by the base station, the PDMA resources into the groups of PDMA resources according to the diversity level, and configuring, by the base station, the groups of PDMA resources to obtain a first PDMA resource pool and a second PDMA resource pool, wherein the first PDMA resource pool comprises all or a part of orthogonal PDMA resources, and the second PDMA resource pool comprises all PDMA resources in a system or remaining PDMA resources in the system other than the PDMA resources in the first PDMA resource pool; and
notifying by the base station the UE of the at least two groups of PDMA resource pools, to enable the UE to select, according to the measurement value acquired by the UE and the PDMA resource pool threshold value, the PDMA resource pool from the at least two groups of PDMA resource pools comprises:
notifying, by the base station, the UE of the first PDMA resource pool and the second PDMA resource pool, to enable the UE to select, according to the measurement value acquired by the UE and the PDMA resource pool threshold value, the PDMA resource pool from the first PDMA resource pool and the second PDMA resource pool.

3. The uplink scheduling-free transmission method according to claim 2, wherein
the PDMA resources comprise any one or more of a time-domain resource, a frequency-domain resource, a space-domain resource and a code-domain resource,
wherein the code-domain resource comprises any one or more of a codebook, a codeword, a sequence, an interleaver and a mapping pattern.

4. The uplink scheduling-free transmission method according to claim 2, wherein the first PDMA resource pool is differentiated from the second PDMA resource pool through a a PDMA resource pool threshold value.

5. An uplink scheduling-free transmission method, comprising:
acquiring, by a UE, at least two groups of PDMA resource pools preconfigured by a base station according to a diversity level, wherein at least parts of respective PDMA resources in the at least two groups of PDMA resource pools are different from each other, and the at least two groups of PDMA resource pools are differentiated from each other through a PDMA resource pool threshold value; and
selecting, by the UE, a PDMA resource pool from the at least two groups of PDMA resource pools, wherein the selected PDMA resource pool is to be used by the UE,
wherein selecting by the UE the PDMA resource pool from the at least two groups of PDMA resource pools comprises:
acquiring, by the UE a measurement value; and
selecting, by the UE, the PDMA resource pool from the at least two groups of PDMA resource pools in accordance with the measurement value and the PDMA resource pool threshold value.

6. The uplink scheduling-free transmission method according to claim 5, wherein
the at least two groups of PDMA resource pools comprise a first PDMA resource pool and a second PDMA resource pool, the first PDMA resource pool comprises all or a part of orthogonal PDMA resources, and the second PDMA resource pool comprises all PDMA resources in a system or remaining PDMA resources in the system other than the PDMA resources in the first PDMA resource pool.

7. The uplink scheduling-free transmission method according to claim 6, wherein the first PDMA resource pool is differentiated from the second PDMA resource pool through a PDMA resource pool threshold value.

8. A UE using the uplink scheduling-free transmission method according to claim 5, comprising a processor, a memory and a transceiver, wherein the processor is configured to read a program stored in the memory to:
acquire through the transceiver at least two groups of PDMA resource pools preconfigured by a base station according to a diversity level, wherein at least parts of respective PDMA resources in the at least two groups of PDMA resource pools are different from each other and the at least two rous of PDMA resource pools are differentiated from each other through a PDMA resource pool threshold value; and
select a PDMA resource pool from the at least two groups of PDMA resource pools, wherein the selected PDMA resource pool is to be used by the UE,
wherein the transceiver is configured to receive and transmit data, and the memory is configured to store therein data for an operation of the processor,
wherein the processor is further configured to read the program stored in the memory to:
acquire a measurement value; and
select the PDMA resource pool from the at least two groups of PDMA resource pools in accordance with the measurement value and the PDMA resource pool threshold value.

9. The UE according to claim 8, wherein
the at least two groups of PDMA resource pools comprise a first PDMA resource pool and a second PDMA resource pool, the first PDMA resource pool comprises all or a part of orthogonal PDMA resources, and the second PDMA resource pool comprises all PDMA resources in a system or remaining PDMA resources in the system other than the PDMA resources in the first PDMA resource pool.

10. The UE according to claim 1, wherein the first PDMA resource pool is differentiated from the second PDMA resource pool through a PDMA resource pool threshold value.

11. A base station, comprising a processor, a memory and a transceiver, wherein the processor is configured to read a program stored in the memory to:
divide PDMA resources into groups of PDMA resources according to a diversity level, and configure the groups of PDMA resources to obtain at least two groups of PDMA resource pools, wherein at least parts of respective PDMA resources in the at least two groups of PDMA resource pools are different from each other, and the at least two groups of PDMA resource pools are differentiated from each other through a PDMA resource pool threshold value; and
notify through the transceiver a UE of the at least two groups of PDMA resource pools, to enable the UE to select, according to a measurement value acquired by the UE and the PDMA resource pool threshold value a PDMA resource pool from the at least two groups of PDMA resource pools, wherein the selected PDMA resource pool is to be used by the UE,
wherein the transceiver is configured to receive and transmit data, and the memory is configured to store therein data for an operation of the processor.

12. The base station according to claim 11, wherein the processor is further configured to read the program stored in the memory to:
divide the PDMA resources into the groups of PDMA resources according to a diversity level, and configure the groups of PDMA resources to obtain a first PDMA resource pool and a second PDMA resource pool, wherein the first PDMA resource pool comprises all or a part of orthogonal PDMA resources, and the second PDMA resource pool comprises all PDMA resources in a system or remaining PDMA resources in the system other than the PDMA resources in the first PDMA resource pool; and
notify the UE of the first PDMA resource pool and the second PDMA resource pool, to enable the UE to select according to the measurement value acquired by the UE and the PDMA resource pool threshold value, the PDMA resource pool from the first PDMA resource pool and the second PDMA resource pool.

13. The base station according to claim 12, wherein the PDMA resources comprise any one or more of a time-domain resource, a frequency-domain resource, a space-domain resource and a code-domain resource,
wherein the code-domain resource comprises any one or more of a codebook, a codeword, a sequence, an interleaver and a mapping pattern.

14. The base station according to claim 12, wherein the first PDMA resource pool is differentiated from the second PDMA resource pool through a PDMA resource pool threshold value.

* * * * *